US010408607B2

(12) United States Patent
Kim et al.

(10) Patent No.: US 10,408,607 B2
(45) Date of Patent: Sep. 10, 2019

(54) APPARATUS AND METHOD FOR CHECKING WHETHER TABLE IS AT TILT

(71) Applicant: ISMEDIA CO., LTD., Anyang-si, Gyeonggi-do (KR)

(72) Inventors: Jong Won Kim, Anyang-si (KR); Yong Woo Han, Anyang-si (KR)

(73) Assignee: ISMEDIA CO., LTD., Anyang-si, Gyeonggi-Do (KR)

( * ) Notice: Subject to any disclaimer, the term of this patent is extended or adjusted under 35 U.S.C. 154(b) by 73 days.

(21) Appl. No.: 15/703,178

(22) Filed: Sep. 13, 2017

(65) Prior Publication Data
US 2018/0164095 A1 Jun. 14, 2018

(30) Foreign Application Priority Data
Dec. 14, 2016 (KR) .................. 10-2016-0170473

(51) Int. Cl.
*G01B 11/26* (2006.01)
*H04N 5/225* (2006.01)
*H04N 17/00* (2006.01)

(52) U.S. Cl.
CPC .......... *G01B 11/26* (2013.01); *H04N 5/2257* (2013.01); *H04N 17/002* (2013.01)

(58) Field of Classification Search
CPC ...................................... G01B 11/26
USPC ...................................... 356/401
See application file for complete search history.

(56) References Cited

U.S. PATENT DOCUMENTS

| 2003/0090662 | A1* | 5/2003 | Yamamoto | G01B 11/26 356/401 |
| 2007/0258068 | A1* | 11/2007 | Horikawa | G03F 7/70341 355/53 |
| 2010/0045959 | A1* | 2/2010 | Chou | G03F 9/7034 355/72 |
| 2010/0302523 | A1* | 12/2010 | Shiraishi | G03F 7/706 355/67 |
| 2013/0258308 | A1* | 10/2013 | Sakamoto | G03F 7/70775 355/72 |

(Continued)

FOREIGN PATENT DOCUMENTS

JP H06-160022 A 6/1994
JP 2012-068188 A 4/2012

(Continued)

*Primary Examiner* — Kara E. Geisel
*Assistant Examiner* — Omar H Nixon
(74) *Attorney, Agent, or Firm* — Rabin & Berdo, P.C.

(57) ABSTRACT

An apparatus for checking whether a table is at tilt is provided, which is capable of checking whether a table is at tilt from an initially-set position or not even during an operation of an inspecting apparatus. Accordingly, the apparatus for checking whether a table is at tilt, which is for use in a camera module inspecting apparatus is provided, in which the camera module inspecting apparatus includes a fixing part; a plurality of test zones provided above the fixing part; a table movable to sequentially guide a camera module sequentially to the respective test zones; and a chart respectively provided in one or more of the test zones among the plurality of test zones, and the table tilt checking apparatus includes a first position mark marked on the table and a first mark photographer provided on the fixing part, facing toward the first position mark.

2 Claims, 11 Drawing Sheets

(56) References Cited

U.S. PATENT DOCUMENTS

| | | | | |
|---|---|---|---|---|
| 2013/0323651 A1* | 12/2013 | Solak | ............... | G03F 7/201 |
| | | | | 430/322 |
| 2014/0198149 A1* | 7/2014 | Kang | ............... | B41J 3/28 |
| | | | | 347/19 |
| 2016/0341974 A1* | 11/2016 | Kishine | ............... | G03B 43/00 |

FOREIGN PATENT DOCUMENTS

| | | |
|---|---|---|
| JP | 2013510496 A | 3/2013 |
| KR | 10-0896803 B1 | 5/2009 |
| KR | 10-1073604 B1 | 10/2011 |

\* cited by examiner

APPARATUS AND METHOD FOR CHECKING WHETHER TABLE IS AT TILT

BACKGROUND

Technical Field

The present disclosure relates to an apparatus and a method for checking whether a table for use in a camera module inspecting apparatus is at tilt from an initially-set state.

Background Art

Generally, a portable terminal such as a mobile phone, a personal digital assistant (PDA), and so on provides not only the original functions of a terminal, but also the functions such as photographing, video capturing, and so on with a camera module generally equipped therein, and the performance of the camera module is continuously enhanced to provide high resolution and high definition photographing.

During fabrication process, such camera module undergoes an operability inspection such as focal point adjustment, resolution examination, and so on for determining possible defect.

FIG. 1 is a schematic view of a related apparatus for inspecting a camera module. For reference, FIG. 1 corresponds to FIG. 1 of KR Patent Publication No. 10-1073604, in which reference numerals remain unchanged for convenience of explanation.

The related apparatus for inspecting camera module performs a process that involves rotating a table 31 so that a camera module is placed in a corresponding test zone, and then photographing a chart unit 50 (or 60) with the camera module, and receiving the photographed data and analyzing a focal state. For example, a fixed focal adjustment is performed in the first test zone using a first chart 50, and an automatic focal driving inspection is performed in the second test zone using a second chart 60. For reference, FIG. 2 illustrates an exemplary chart unit that can be used in such situation. FIG. 2 schematically illustrates a related general chart, and it corresponds to FIG. 16 of KR Patent Publication No. 10-0896803.

The position of the table is initially set particularly in consideration of positional relationship with the chart that is used for inspecting the focal point, resolution, and so on of the camera module placed on the table. The current technology requires that the apparatus for inspecting camera module be stopped about once a day to check whether the table is at the initially-set state or not.

However, this reduces yield as the apparatus for inspecting camera module has to be stopped about once a day to check it regardless of whether the table is at the initially-set position or not.

PRIOR ART DOCUMENTS

KR Patent Registration No. 10-1073604 (registered on Oct. 7, 2011)

SUMMARY

A technical object of the present disclosure is to provide an apparatus and a method for checking whether a table is at tilt, which are capable of checking whether or not a table is at tilt from an initially-set position even during an operation of the inspecting apparatus.

In order to achieve the objects mentioned above, a table tilt checking apparatus is provided, which may be provided for use in a camera module inspecting apparatus including a fixing part; a plurality of test zones provided above the fixing part; a table movable to sequentially guide a camera module to the respective test zones; and a chart respectively provided in one or more of the test zones among the plurality of test zones, in which the table tilt checking apparatus may include a first position mark marked on the table and a first mark photographer provided on the fixing part, facing toward the first position mark.

In an initial state in which the camera module inspecting apparatus is normally installed, position of the first position mark or the first mark photographer may be determined such that the first position mark is placed at a first point of a portion that is photographed by the first mark photographer.

In an example, the fixing part may include a main base placed downward apart from the table.

The first mark photographer may be provided on the main base.

In another example, the fixing part may further include a first pillar member fixed to a portion of the main base.

The first mark photographer may be provided on the first pillar member.

The first pillar member may be passed through a center of the table.

In another example, the first pillar member may be placed outward apart from an outer circumference of the table.

Meanwhile, a table tilt checking apparatus according to an embodiment of the present disclosure is provided for use in a camera module inspecting apparatus including a fixing part; a plurality of test zones provided above the fixing part; a table movable to sequentially guide a camera module to the respective test zones; and a chart provided in each of one or more test zones of a plurality of test zones, in which the one or more test zones may include first and second test zones, and the one or more chart may include a first chart provided in the first test zone and a second chart provided in the second test zone, and in which the table tilt checking apparatus may include a first position mark marked on a portion of the table corresponding to the first test zone, a first mark photographer provided on the fixing part, facing toward the first position mark, and a second position mark marked on a portion of the table corresponding to the second test zone.

In another embodiment of the present disclosure, the table tilt checking apparatus may further include a second mark photographer provided on the fixing part, facing toward the second position mark. Position of the second position mark or the second mark photographer may be determined such that, in an initial state in which the camera module inspecting apparatus is normally installed, the second position mark is placed at a second point of a portion that is photographed by the second mark photographer.

The fixing part may include a main base placed downward apart from the table.

In an example, the first and second mark photographers may be provided on the main base.

In another example, the fixing part may further include a first pillar member fixed to a portion of the main base.

The first pillar member may be passed through a center of the table, and the first and second mark photographers may be marked on the first pillar member.

As another example, the fixing part may further include a second pillar member fixed to the other portion of the main base, in which the first pillar member may be placed outward apart from an outer circumference of the table and in correspondence with the first test zone, and the second pillar member is placed outward apart from the outer circumference of the table and in correspondence with the second test zone, and the first and second mark photographers may be marked on the first and second pillar members, respectively.

As described above, an apparatus and a method for checking whether a table is at tilt or not according to embodiments of the present disclosure may provide the following effects.

According to embodiments of the present disclosure, a technical configuration including the first position mark and the first mark photographer is provided, so that it is possible to check whether the initially-set table is at tilt or not even during operation of the camera module inspecting apparatus, and thus, unlike the related art, it is not necessary to stop the camera module inspecting apparatus about once a day to inspect the same. As a result, yield can be enhanced.

Further, according to embodiments of the present disclosure, the camera module inspecting apparatus can provide enhanced accuracy of inspection than related technologies, since it is possible to check whether the table is at tilt or not every time the table is returned to the initial position, by using the first position mark and the first mark photographer rather than relying on the naked eye.

In addition, according to the embodiments of the present disclosure, a technical configuration is provided, which includes the first position mark marked on the moving table and the first mark photographer provided in the stationary fixing part. Accordingly, contrary to when the first mark photographer is provided on the moving table in which case the cable connected to the first mark photographer is often tangled, the first mark photographer is provided on the stationary fixing part, thereby preventing tangling of the cable of the first mark camera.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, embodiments of the present disclosure will be described in detail with reference to the accompanying drawings, which will be readily apparent to those skilled in the art to which the present disclosure pertains. However, the present disclosure proposed herein is just a preferable example for the purpose of illustrations only, not intended to limit the scope of the disclosure, so it should be understood that other equivalents and modifications could be made thereto without departing from the scope of the disclosure.

Figure 1:
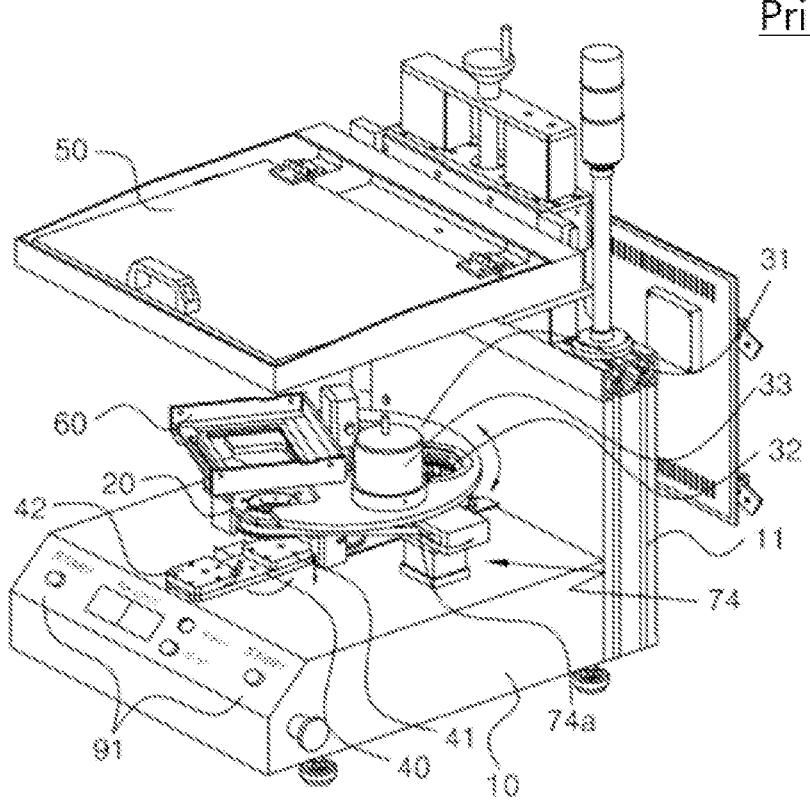
FIG. 1 is a schematic view of a related camera module inspecting apparatus.
Figure 2:
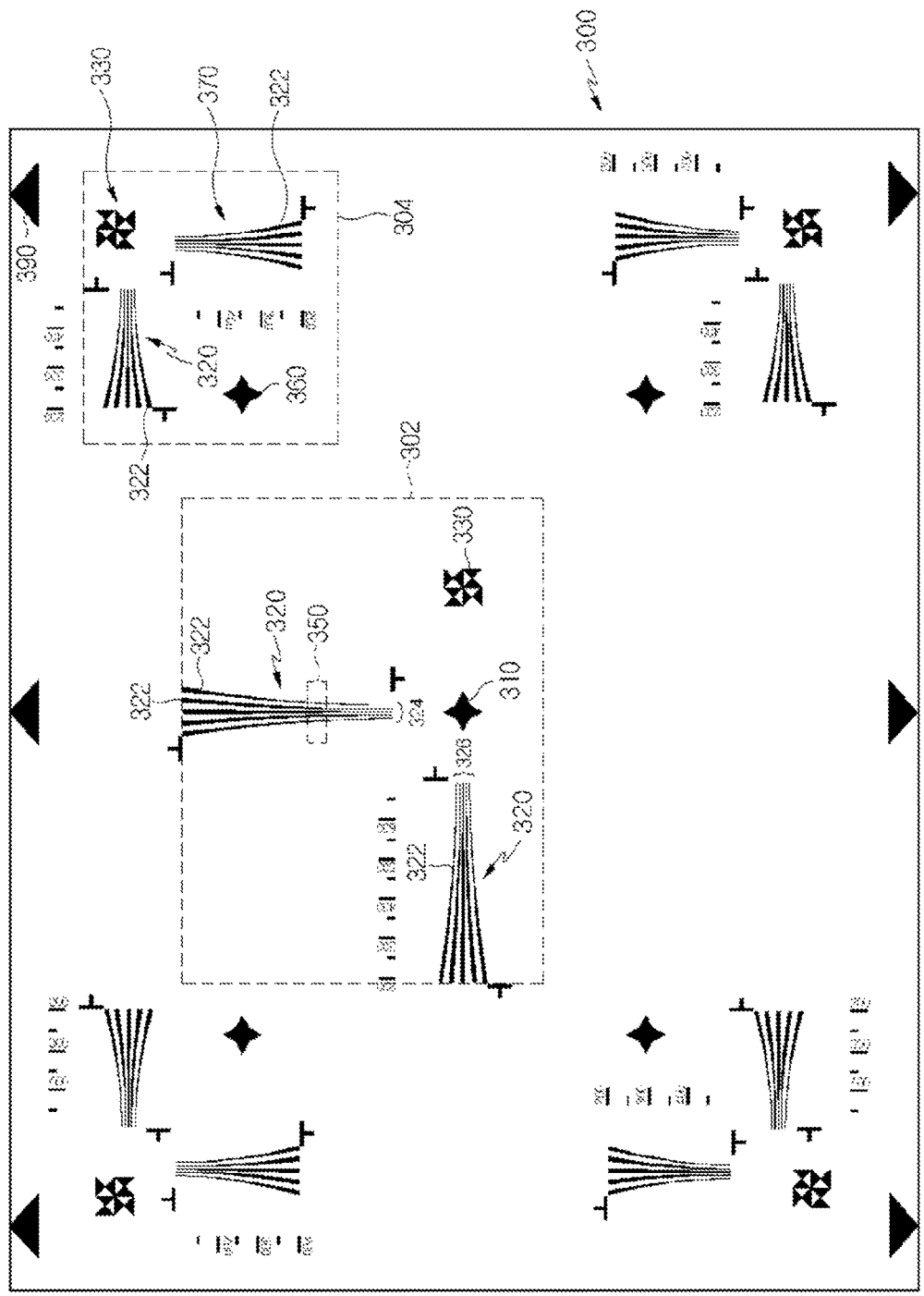
FIG. 2 is a schematic view of a typical chart.
Figure 3:
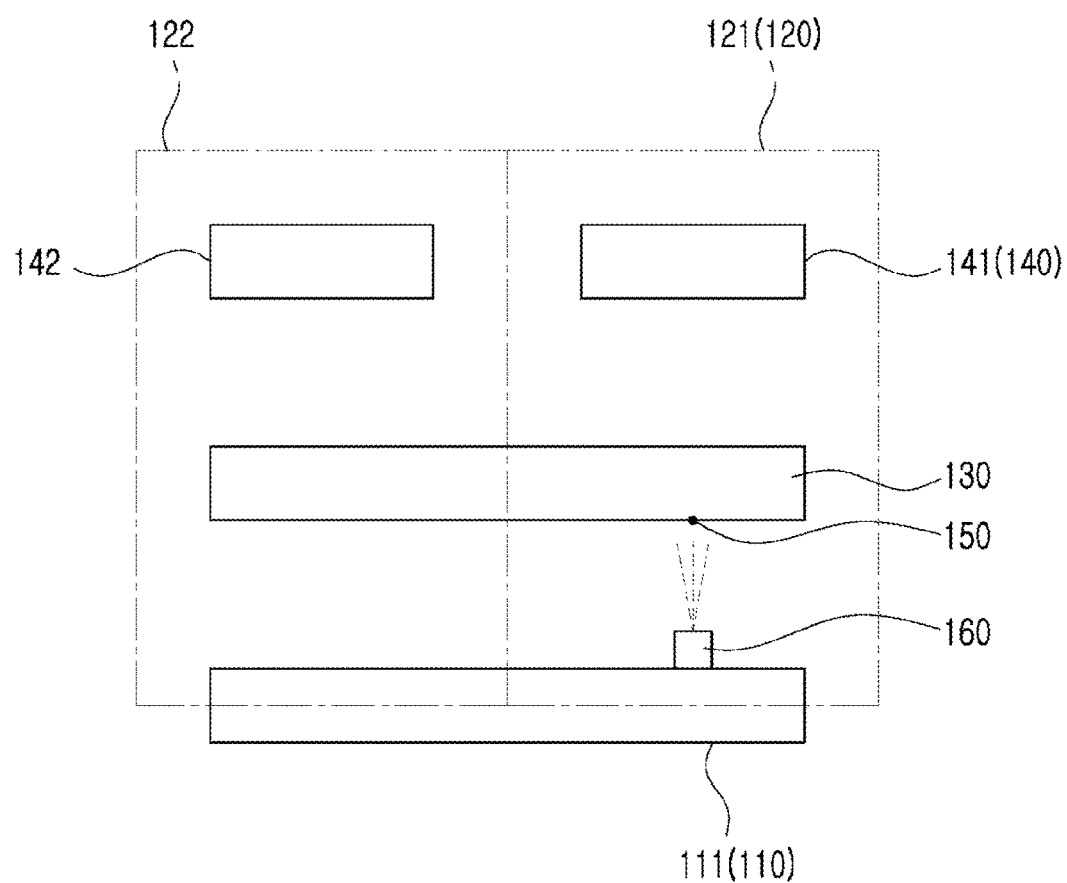
FIG. 3 is a schematic view of an apparatus for checking whether a table is at tilt or not (hereinbelow, 'table tilt checking apparatus') according to a first embodiment of the present disclosure.

FIG. 3 is a schematic view of a table tilt checking apparatus according to a first embodiment of the present disclosure.

A table tilt checking apparatus according to a first embodiment of the present disclosure may be adopted for use in a camera module inspecting apparatus, and may include a first position mark 150 and a first mark photographer 160, as illustrated in FIG. 3.

As illustrated in FIG. 3, the camera module inspecting apparatus may include a fixing part 110, a plurality of test zones 120 provided above the fixing part 110, a moving table 130 to guide a camera module (not shown) sequentially to the respective test zones 120, and charts 140 respectively provided in one or more of a plurality of test zones 120. Further, one or more test zones 120 may include first and second test zones 121 and 122, and one or more charts 140 may include a first chart 141 provided in the first test zone 121 and a second chart 142 provided in the second test zone 122.

Accordingly, the camera module (not shown) being loaded on the table 130 via a socket (not shown) and so on may be sequentially guided according to a rotation of the table 130 to the respective test zones 120 for inspection thereof. For reference, although not illustrated, the technical configuration for rotating the table 130 may employ a variety of known techniques including, for example, connecting a motor to the table directly or indirectly via a pulley-belt or gear engagement for a rotation of the table, which will not be described in detail as the present disclosure does not relate to rotating a table.

As illustrated in FIG. 3, the first position mark 150 may be marked on the table 130 roughly in a form of a dot. As illustrated in FIG. 3, the first mark photographer 160 may be provided on the fixing part 110, facing toward the first position mark 150 so as to photograph around the first position mark 150.

Accordingly, in accordance with the first embodiment of the present disclosure, a technical configuration including the first position mark 150 and the first mark photographer 160 is provided, so that it is possible to check whether the initially-set table 130 is at tilt or not even during operation of the camera module inspecting apparatus, and thus, unlike related art, it is not necessary to stop the camera module inspecting apparatus about once a day to inspect the same. As a result, yield can be enhanced than a related art. Further, according to the first embodiment of the present disclosure, the camera module inspecting apparatus can provide enhanced accuracy of inspection than related technologies, since it is possible to check possible tilting of the table 130 every time the table is returned to the initial position, by using the first position mark 150 and the first mark photographer 160 rather than relying on naked eye. In addition, according to the first embodiment of the present disclosure, a technical configuration is provided, which includes the first position mark marked on the moving table and the first mark photographer provided in the stationary fixing part. Accordingly, contrary to when the first mark photographer is provided on the moving table in which case the cable connected to the first mark photographer is often tangled, the first mark photographer is provided on the stationary fixing part, thereby preventing tangling of the cable of the first mark camera.

Specifically, in an initial state in which the camera module inspecting apparatus is normally installed, the position of the first position mark 150 or the first mark photographer 160 may be determined such that the first position mark 150 is placed at a first point of a portion that is photographed by the first mark photographer 160. Accordingly, when it is indicated the first position mark 150 photographed through the first mark photographer 160 is deviated from the first point, it may be determined that the table 130 is at tilt.

Further, as illustrated in FIG. 3, the fixing part 110 may include a main base 111 placed at a distance downward apart from the table 130. In the above example, the first mark photographer 160 may be provided on an upper surface of the main base 111, and the first position mark 150 may be provided on a lower surface of the table 130.

Meanwhile, a method for checking whether a table is at tilt or not (hereinafter, 'table tilt checking method') according to the first embodiment is provided, which involves using the table tilt checking apparatus according to the first embodiment of the present disclosure described above. Firstly, in an initial state in which the camera module inspecting apparatus is normally installed, the method involves a process of adjusting the first mark photographer 160 or the first position mark 150 so that the first position mark 150 is placed at a first point of a portion that is photographed by the first mark photographer 160.

When the table 130 moved from the first position is returned back to the first position, the first mark photographer 160 is driven to photograph the first position mark 150.

Then, it is checked whether or not the first position mark 150 is placed at the first point of the portion photographed by the first mark photographer 160, and if the first position mark 150 is not at the first point, it is confirmed that the table 130 is at tilt from the initial state.

Further, it may be set such that, upon confirming that the table 130 is at tilt, an operator may be alerted about the same, or a camera module inspecting apparatus may be automatically stopped.

Figure 4:
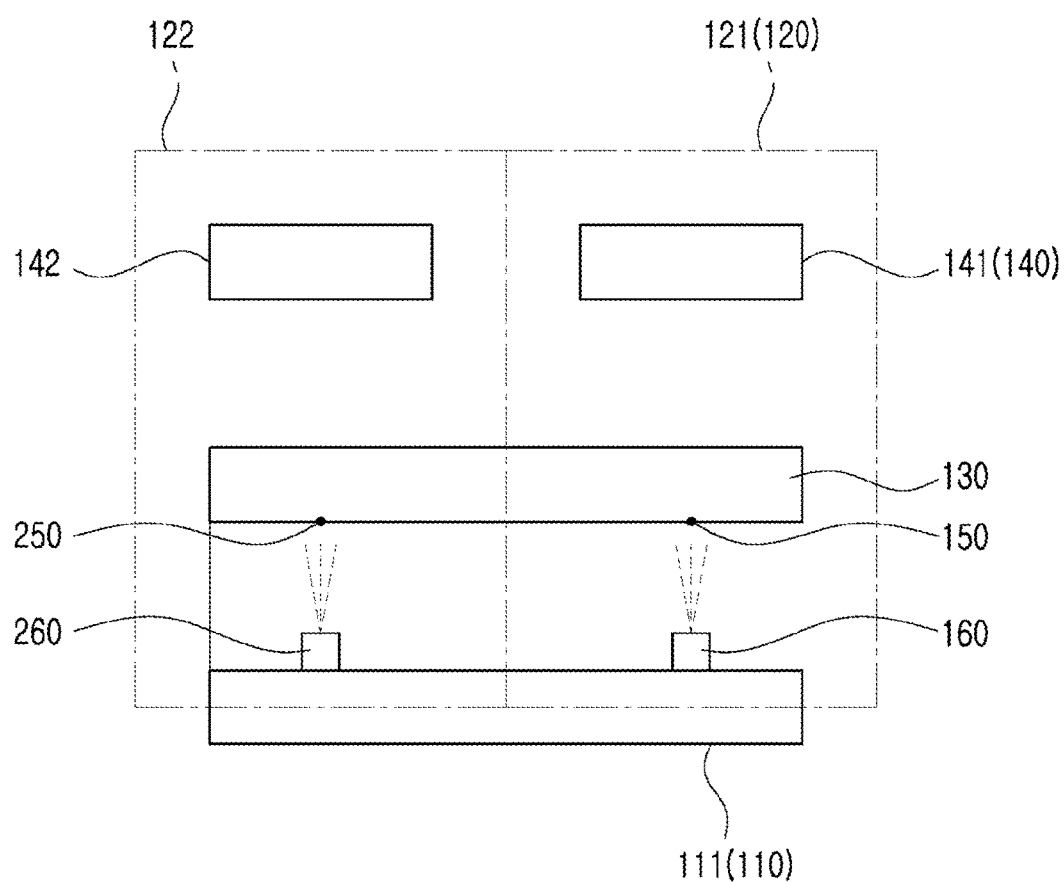
FIG. 4 is a schematic view of a table tilt checking apparatus according to a second embodiment of the present disclosure.

Hereinbelow, a table tilt checking apparatus according to a second embodiment of the present disclosure will be described with reference to FIG. 4. FIG. 4 is a schematic view of a table tilt checking apparatus according to the second embodiment of the present disclosure.

As illustrated in FIG. 4, the table tilt checking apparatus according to the second embodiment of the present disclosure is almost identical to that according to the first embodiment described above, except for further including a second position mark 250 and a second mark photographer 260. Accordingly, the second embodiment will be described below mainly with respect to the second position mark 250 and the second mark photographer 260.

As illustrated in FIG. 4, when the first mark photographer 150 is provided on a portion of the main base 111 that corresponds to the first test zone 121 provided with the first chart 141, the second mark photographer 260 may be provided on a portion of the main base 111 that corresponds to the second test zone 122 provided with the second chart 142. The second position mark 250 may be marked on the table so as to be photographed by the second mark photographer 260.

Accordingly, according to the second embodiment of the present disclosure, in addition to the effect mentioned above in the first embodiment described above, the following additional effects can be provided. That is, because the first position mark 150 and the first mark photographer 160 are provided in the first test zone 121 provided with the first chart 141, and also because the second position mark 250 and the second mark photographer 260 are provided in the second test zone 122 provided with the second chart 142, even if the position relationship between the first chart 141 and a portion of the table 130 facing the first chart is different from the position relationship between the second chart 142 and the other portion of the table 130 facing the second chart 142, the first position mark 150 and the first mark photographer 160, and the second position mark 250 and the second mark photographer 260 may be independently checked, and as a result, the camera module inspecting apparatus can provide enhanced accuracy of inspection than related technologies.

Meanwhile, the table tilt checking method according to the second embodiment is a method for checking whether a table is at tilt or not by using the table tilt checking apparatus according to the second embodiment of the present disclosure. Firstly, in an initial state in which the camera module inspecting apparatus is normally installed, the method involves a process of adjusting the first mark photographer 160 or the first position mark 150 so that the first position mark 150 is placed at a first point of a portion that is photographed by the first mark photographer 160. After or before the above, in an initial state in which the camera module inspecting apparatus is normally installed, the method involves a process of adjusting the second mark photographer 260 or the second position mark 250 so that the second position mark 250 is placed at a second point of a portion that is photographed by the second mark photographer 260.

When the table 130 moved from the first position is returned back to the first position, the first and second mark photographers 160, 260 are driven to photograph the first and second position marks 150, 250, respectively.

Then, it is checked as to whether or not the first position mark 150 is placed at the first point of the portion photographed by the first mark photographer 160, and it is also simultaneously checked as to whether or not the second position mark 250 is placed at the second point of the portion photographed by the second mark photographer 260. Accordingly, when the first position mark 150 is not at the first point or when the second position mark 250 is not at the second point, it is confirmed that the table 130 is at tilt from the initial state.

Further, it may be set such that, upon confirming that the table 130 is at tilt, an operator may be alerted about the same, or a camera module inspecting apparatus may be automatically stopped.

Figure 5:
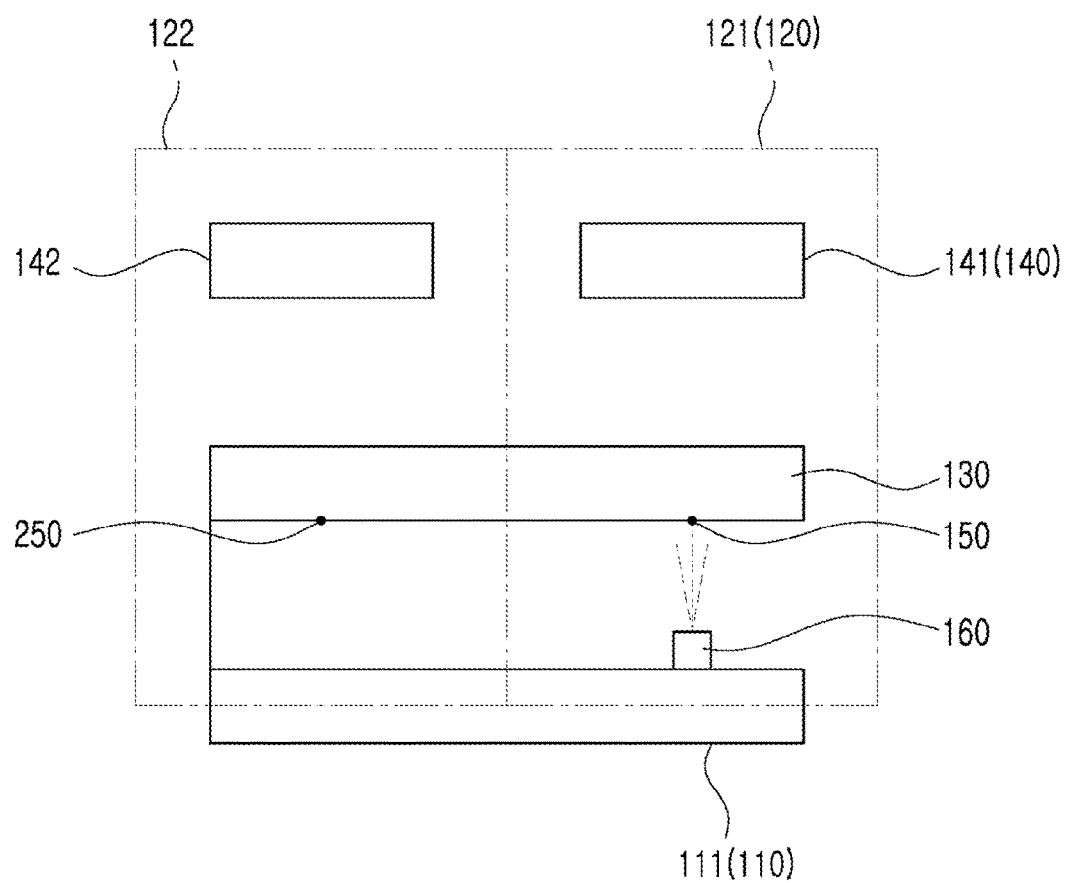
FIG. 5 is a schematic view of a table tilt checking apparatus according to a third embodiment of the present disclosure.

Hereinbelow, a table tilt checking apparatus according to a third embodiment of the present disclosure will be described with reference to FIG. 5. FIG. 5 is a schematic view of a table tilt checking apparatus according to a third embodiment of the present disclosure.

As illustrated in FIG. 5, the table tilt checking apparatus according to the third embodiment of the present disclosure is almost identical to that according to the first embodiment described above, except for further including a second position mark 250. Accordingly, the third embodiment will be described below mainly with respect to the second position mark 250.

As illustrated in FIG. 5, when the first mark 150 described above is marked on a portion of the table 130 that corresponds to the first test zone 121 provided with the first chart 141, the second position mark 250 may be marked on a portion of the table 130 that corresponds to the second test zone 122 provided with the second chart 142.

Specifically, in the initial state in which the camera module inspecting apparatus is normally installed, the position of the first position mark 150 or the first mark photographer 160 may be determined such that the first position mark 150 is placed at a first point of a portion that is photographed by the first mark photographer 160. Specifically, in the state (not shown) in which the portion to be marked with the second position mark 250 has been moved from the second test zone to be placed in the first test zone due to the movement of the table 130, the position of the second position mark 250 or the first mark photographer 160 may be determined such that the second position mark 250 is placed at a first point of a portion that is photographed by the first mark photographer 160. Accordingly, if it is indicated that the first position mark 150 photographed by the first mark photographer 160 is deviated away from the first point, it may be determined that the table 130 is at tilt, and further, in the state (not shown) in which the second position mark 250 is moved from the second test zone 122 to be placed in the first test zone 121 due to the movement of the table 130, when it is indicated that the second position mark 250 photographed in the first mark photographer 160 is deviated away from the first point, it may be determined that the table 130 is at tilt. Accordingly, possible tilting can be confirmed with higher accuracy through a plurality of portions of the table.

Accordingly, in the third embodiment of the present disclosure, by installing only one expensive mark photographer 160 on one portion of the fixing part 110 that corresponds to the first test zone among a plurality of test zones 121, 122 where an item in most need of the tilt inspection is positioned, and installing relatively cheaper position marks 150, 250 on respective portions of the table 130 all across the test zones 121, 122, cost can be reduced, and more accurate tilt checking is enabled through a plurality of portions of the table 130.

Figure 6:
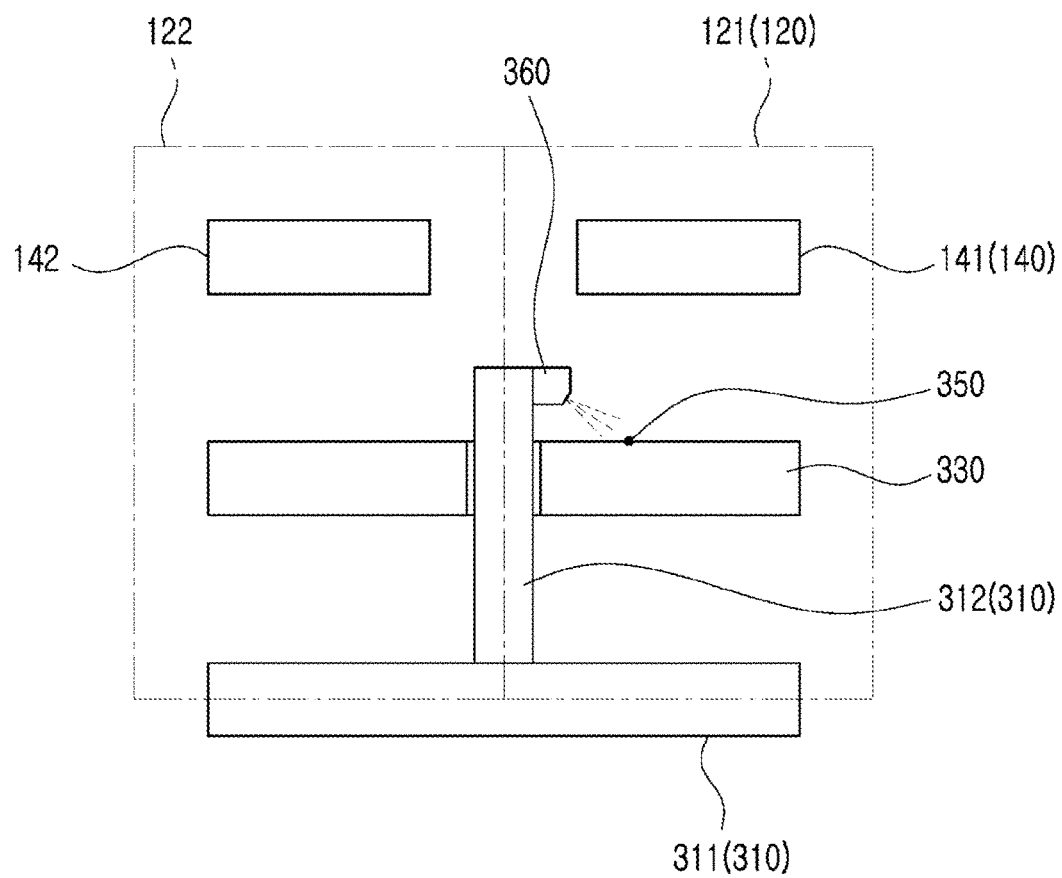
FIG. 6 is a schematic view of a table tilt checking apparatus according to a fourth embodiment of the present disclosure.

Hereinbelow, a table tilt checking apparatus according to a fourth embodiment of the present disclosure will be described with reference to FIG. 6. FIG. 6 is a schematic view of a table tilt checking apparatus according to a fourth embodiment of the present disclosure.

As illustrated in FIG. 6, the table tilt checking apparatus according to the fourth embodiment of the present disclosure is almost identical to that according to the first embodiment of the present disclosure described above, except for a configuration of the fixing part 310, a shape of the table 330, and positions at which the first position mark 350 and the first mark photographer 360 are provided. Accordingly, the fifth embodiment will be described below mainly with respect to the configuration of the fixing part 310, and the positions at which the first position mark 350 and the first mark photographer 360 are provided.

The fixing part 310 may include a main base 311 placed downward apart from the table 330, and a first pillar member 312 fixed to the main base 311. Specifically, the first pillar member 312 may be placed through a center of the table 330. In the above example, the first mark photographer 360 may be provided on a first pillar member 312, and the first position mark 350 may be marked on an upper surface of the table 330. Of course, although not illustrated, when the first mark photographer 360 is provided on the first pillar member 312 that is between the main base 311 and the table 330, the first position mark 350 may be marked on a lower surface of the table 330.

Accordingly, in accordance with the fourth embodiment of the present disclosure, the effects of the first embodiment described above are provided, and in addition, even when a space between the main base 311 and the table 330 is narrow, it is not necessary to change the structure, i.e., to raise the table 330 to use the same.

Figure 7:
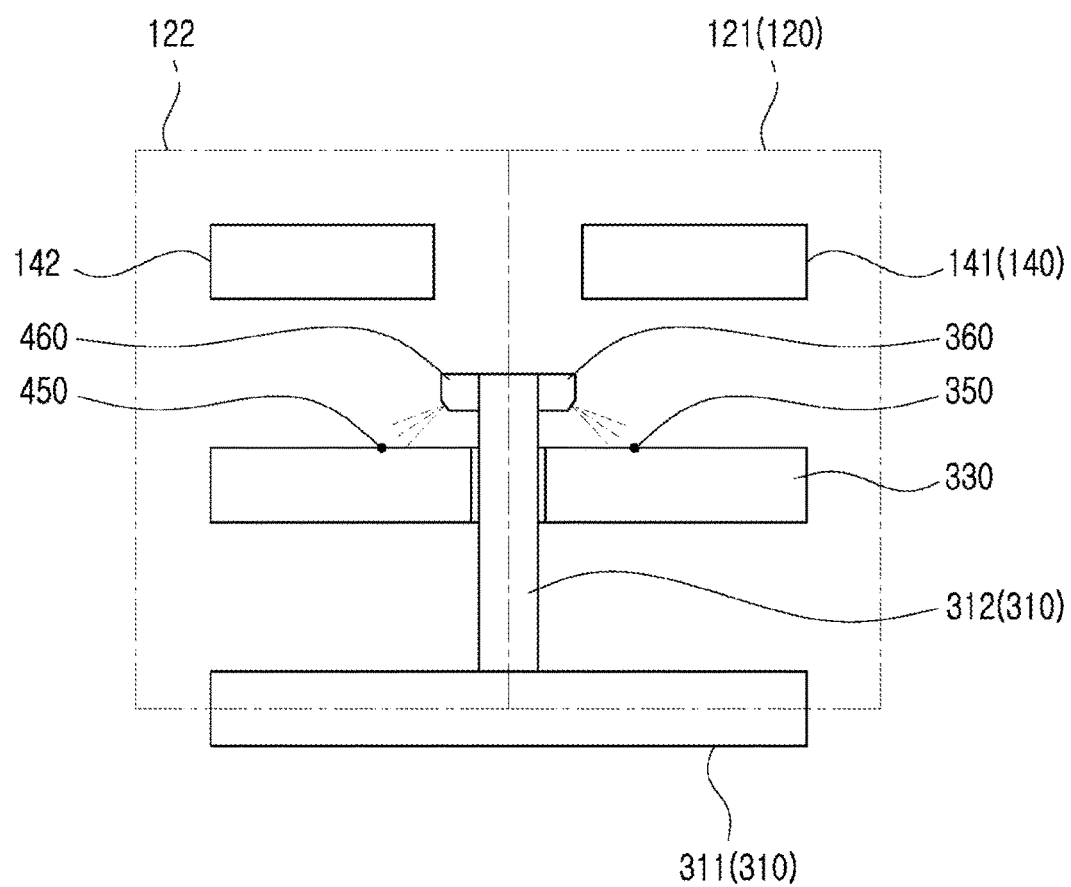
FIG. 7 is a schematic view of a table tilt checking apparatus according to a fifth embodiment of the present disclosure.

Hereinbelow, a table tilt checking apparatus according to a fifth embodiment of the present disclosure will be described with reference to FIG. 7. FIG. 7 is a schematic view of a table tilt checking apparatus according to a fifth embodiment of the present disclosure.

As illustrated in FIG. 7, the table tilt checking apparatus according to the fifth embodiment of the present disclosure is almost identical to that according to the fourth embodiment described above, except for further including a second position mark 450 and a second mark photographer 460. Accordingly, the fifth embodiment will be described below mainly with respect to the second position mark 450 and the second mark photographer 460.

As illustrated in FIG. 7, when the first mark photographer 360 is provided on a portion of the first pillar 312 that corresponds to the first test zone 121 provided with the first chart 141, the second mark photographer 460 may be marked on a portion of the first pillar 312 that corresponds to the second test zone 122 provided with the second chart 142. The second position mark 450 may be marked on the table so as to be photographed by the second mark photographer 460.

Accordingly, according to the fifth embodiment of the present disclosure, in addition to the effect mentioned in the fourth embodiment described above, the following additional effects can be provided. That is, because the first position mark 350 and the first mark photographer 360 are provided in the first test zone 121 provided with the first chart 141, and also because the second position mark 450 and the second mark photographer 460 are provided in the second test zone 122 provided with the second chart 142, even if the position relationship between the first chart 141 and a portion of the table 330 facing the first chart is different from the position relationship between the second chart 142 and the other portion of the table 330 facing the second chart 142, the first position mark 350 and the first mark photographer 360, and the second position mark 450 and the second mark photographer 460 may be independently checked, and as a result, the camera module inspecting apparatus can provide enhanced accuracy of inspection than related technologies.

Figure 8:
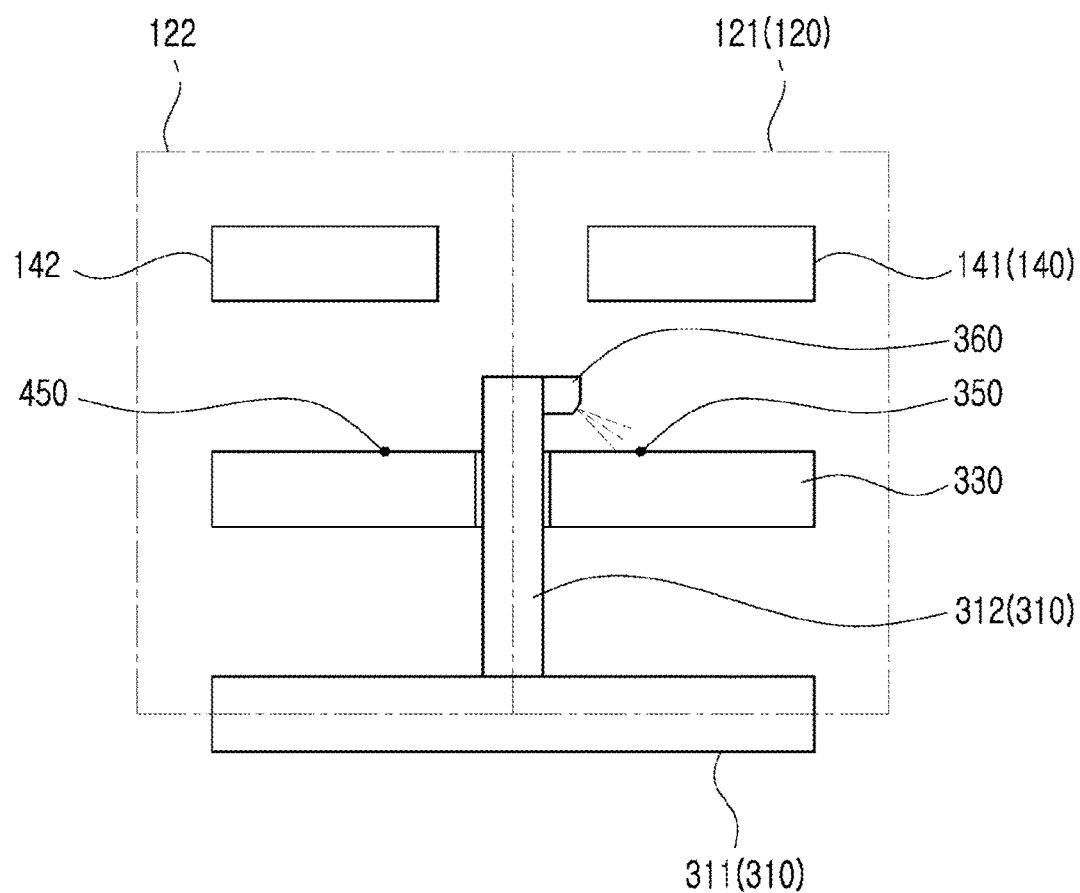
FIG. 8 is a schematic view of a table tilt checking apparatus according to a sixth embodiment of the present disclosure.

Hereinbelow, a table tilt checking apparatus according to a sixth embodiment of the present disclosure will be described with reference to FIG. 8. FIG. 8 is a schematic view of a table tilt checking apparatus according to a sixth embodiment of the present disclosure.

As illustrated in FIG. 8, the table tilt checking apparatus according to the sixth embodiment of the present disclosure is almost identical to the fourth embodiment described above, except for further including a second position mark 450. Accordingly, the sixth embodiment will be described below mainly with respect to the second position mark 450.

As illustrated in FIG. 8, when the first mark photographer 350 is marked on a portion of the table 330 that corresponds to the first test zone 121 provided with the first chart 141, the second position mark 450 may be marked on a portion of the table 330 that corresponds to the second test zone 122 provided with the second chart 142.

Specifically, in the initial state in which the camera module inspecting apparatus is normally installed, the position of the first position mark 350 or the first mark photographer 360 may be determined such that the first position mark 350 is placed at a first point of a portion that is photographed by the first mark photographer 360. Specifically, in the state (not shown) in which the portion to be marked with the second position mark 450 has been moved from the second test zone to be placed in the first test zone due to the movement of the table 330, the position of the second position mark 450 or the first mark photographer 360 may be determined such that the second position mark 450 is placed at a first point of a portion that is photographed by the first mark photographer 360. Accordingly, if it is indicated that the first position mark 350 photographed by the first mark photographer 360 is deviated away from the first point, it may be determined that the table 330 is at tilt, and further, in the state (not shown) in which the second position mark 450 is moved from the second test zone 122 to be placed in the first test zone 121 due to the movement of the table 330, when it is indicated that the second position mark 450 photographed in the first mark photographer 360 is deviated away from the first point, it may be determined that the table 330 is at tilt. Accordingly, possible tilting can be confirmed with higher accuracy through a plurality of portions of the table.

Accordingly, in the sixth embodiment of the present disclosure, by installing only one expensive mark photographer 360 on one portion of the first pillar part 312 that corresponds to the first test zone among a plurality of test zones 121, 122 where an item in most need of the tilt inspection is positioned, and installing relatively cheaper position marks 350, 450 on respective portions of the table 330 all across the test zones 121, 122, cost can be reduced, and more accurate tilt checking is enabled through a plurality of portions of the table 330.

Figure 9:
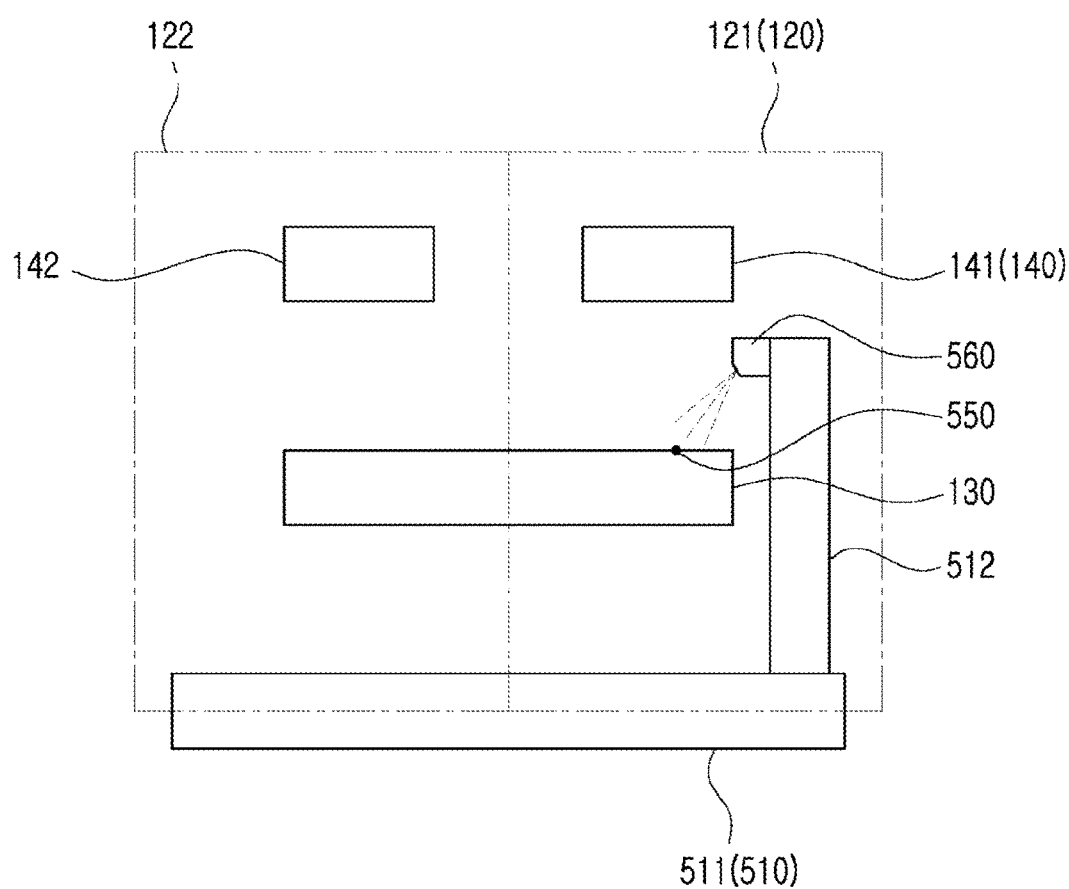
FIG. 9 is a schematic view of a table tilt checking apparatus according to a seventh embodiment of the present disclosure.

Hereinbelow, a table tilt checking apparatus according to a seventh embodiment of the present disclosure will be described with reference to FIG. 9. FIG. 9 is a schematic view of a table tilt checking apparatus according to a seventh embodiment of the present disclosure.

As illustrated in FIG. 9, the table tilt checking apparatus according to the seventh embodiment of the present disclosure is almost identical to the first embodiment of the present disclosure described above, except for a configuration of the fixing part 510, and positions at which the first position mark 550 and the first mark photographer 560 are provided. Accordingly, the seventh embodiment will be described below mainly with respect to the configuration of the fixing part 510, and the positions at which the first position mark 550 and the first mark photographer 560 are provided.

The fixing part 510 may include a main base 511 placed downward apart from the table 130, and a first pillar member 512 fixed to the main base 511. Specifically, the first pillar member 512 may be placed outward apart from an outer circumference of the table 130. In the above example, the first mark photographer 560 may be provided on a first pillar member 512, and the first position mark 550 may be marked on an upper surface of the table 130. Of course, although not illustrated, when the first mark photographer 560 is provided on the first pillar member 512 that is between the main base 511 and the table 130, the first position mark 550 may be marked on a lower surface of the table 130.

Accordingly, in accordance with the seventh embodiment of the present disclosure, the effects of the first embodiment described above are provided, and in addition, even when a space between the main base 511 and the table 130 is narrow, it is not necessary to change the structure, i.e., to raise the table 130 to use the same. Further, an embodiment may be applied for a type in which a motor (not shown) is directly connected to a center of the table 130 to rotate the table 130.

Figure 10:
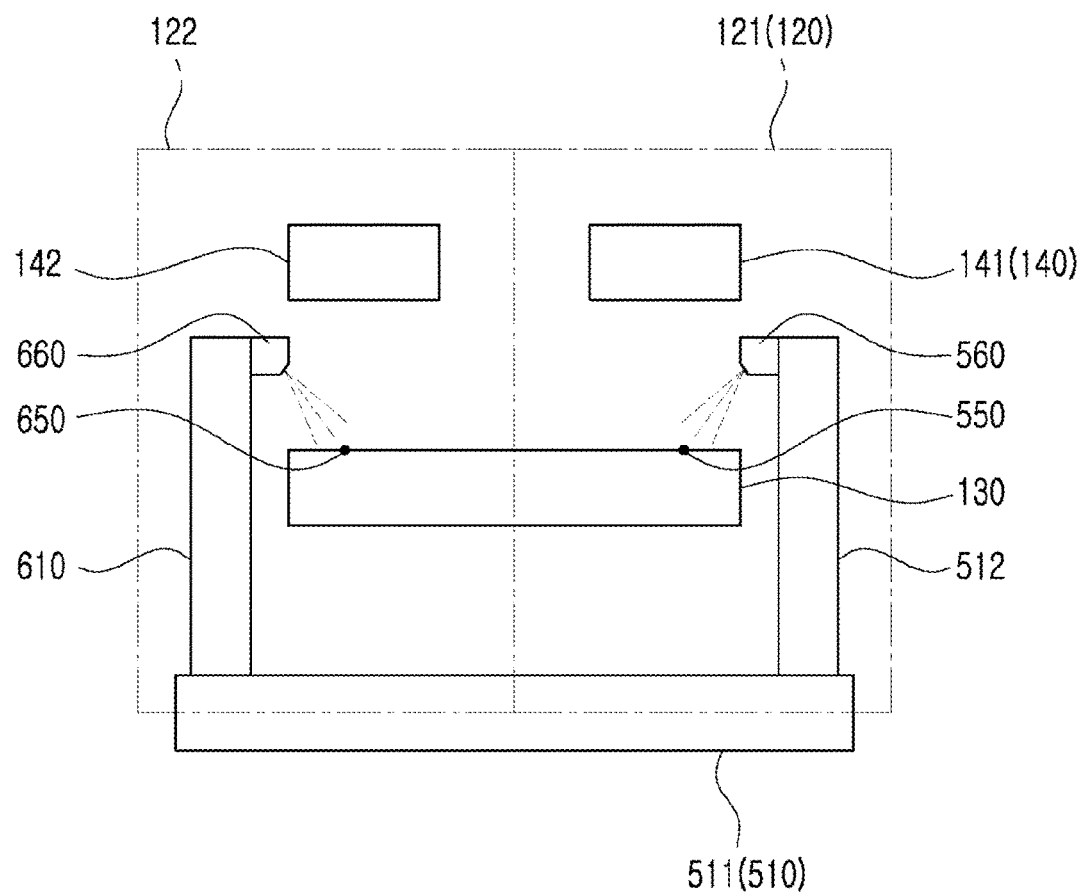
FIG. 10 is a schematic view of a table tilt checking apparatus according to an eighth embodiment of the present disclosure.

Hereinbelow, a table tilt checking apparatus according to an eighth embodiment of the present disclosure will be described with reference to FIG. 10. FIG. 10 is a schematic view of a table tilt checking apparatus according to an eighth embodiment of the present disclosure.

As illustrated in FIG. 10, the table tilt checking apparatus according to the eighth embodiment of the present disclosure is almost identical to the seventh embodiment described above, except for further including a second pillar member 610, a second position mark 650 and a second mark photographer 660. Accordingly, the eighth embodiment will be described below mainly with respect to the second pillar member 610, the second position mark 650, and the second mark photographer 660.

As illustrated in FIG. 10, when the first pillar member 512 described above is provided on a portion corresponding to the first test zone 121 that is provided with the first chart 141, the second pillar member 610 may be provided on a portion corresponding to the second test zone 122 that is provided with the second chart 142.

When the first mark photographer 560 described above is provided on the first pillar member 512, facing toward the first position mark 550, the second mark photographer 660 may be provided on the second pillar member 610, facing toward the second position mark 650.

The second position mark 650 may be marked on the table so as to be photographed by the second mark photographer 660.

Accordingly, according to the eighth embodiment of the present disclosure, in addition to the effect mentioned above in the seventh embodiment described above, the following additional effects can be provided. That is, because the first position mark 550 and the first mark photographer 560 are provided in the first test zone 121 provided with the first chart 141, and also because the second position mark 650 and the second mark photographer 660 are provided in the second test zone 122 provided with the second chart 142, even if the position relationship between the first chart 141 and a portion of the table 130 facing the first chart is different from the position relationship between the second chart 142 and the other portion of the table 130 facing the second chart 142, the first position mark 550 and the first mark photographer 560, and the second position mark 650 and the second mark photographer 660 may be independently checked, and as a result, the camera module inspecting apparatus can provide enhanced accuracy of inspection than related technologies.

Figure 11:
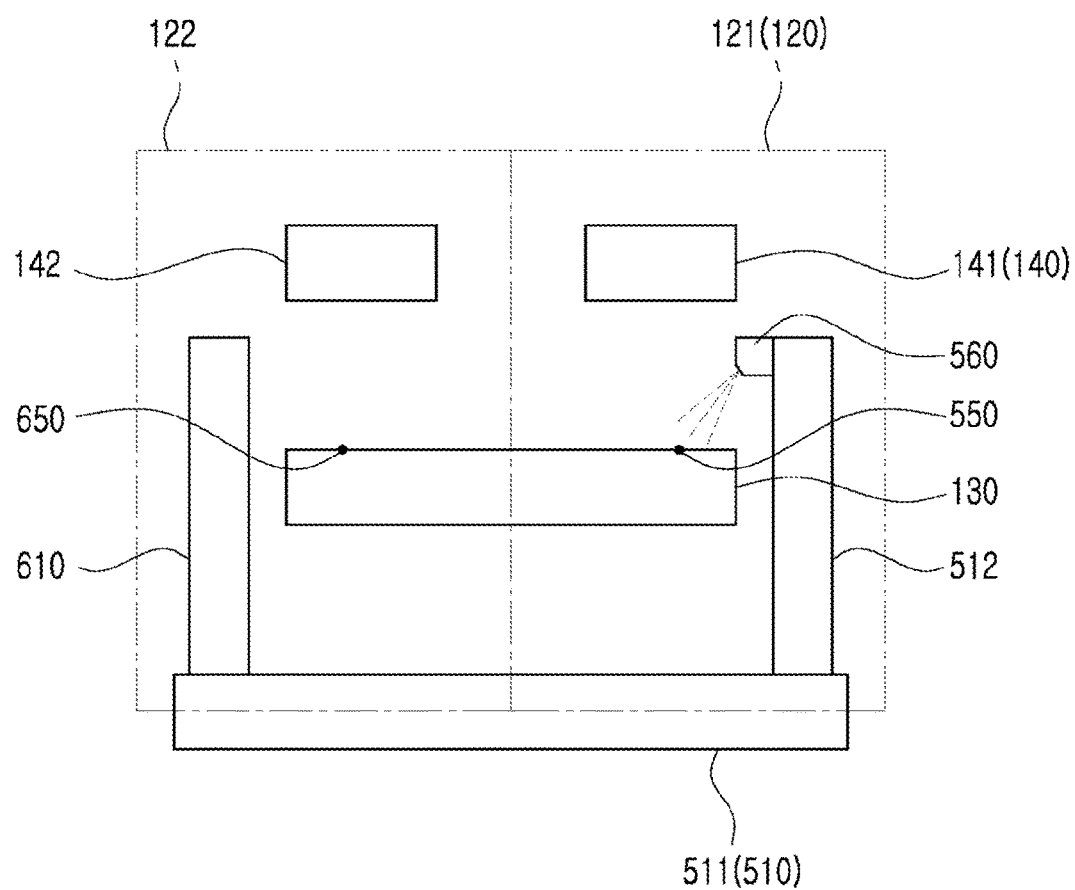
FIG. 11 is a schematic view of a table tilt checking apparatus according to a ninth embodiment of the present disclosure.

Hereinbelow, a table tilt checking apparatus according to a ninth embodiment of the present disclosure will be described with reference to FIG. 11. FIG. 11 is a schematic view of a table tilt checking apparatus according to a ninth embodiment of the present disclosure.

As illustrated in FIG. 11, the table tilt checking apparatus according to the ninth embodiment of the present disclosure is almost identical to the seventh embodiment described above, except for further including a second position mark 650. Accordingly, the ninth embodiment will be described below mainly with respect to the second position mark 650.

As illustrated in FIG. 11, when the first mark photographer 550 is marked on a portion of the table 130 that corresponds to the first test zone 121 provided with the first chart 141, the second position mark 650 may be marked on a portion of the table 130 that corresponds to the second test zone 122 provided with the second chart 142.

Specifically, in the initial state in which the camera module inspecting apparatus is normally installed, the position of the first position mark 550 or the first mark photographer 560 may be determined such that the first position mark 550 is placed at a first point of a portion that is photographed by the first mark photographer 560. Specifically, in the state (not shown) in which the portion to be marked with the second position mark 650 has been moved from the second test zone to be placed in the first test zone due to the movement of the table 130, the position of the second position mark 650 or the first mark photographer 560 may be determined such that the second position mark 650 is placed at a first point of a portion that is photographed by the first mark photographer 560. Accordingly, if it is indicated that the first position mark 550 photographed by the first mark photographer 560 is deviated away from the first point, it may be determined that the table 130 is at tilt, and further, in the state (not shown) in which the second position mark 650 is moved from the second test zone 122 to be placed in the first test zone 121 due to the movement of the table 130, when it is indicated that the second position mark 650 photographed in the first mark photographer 560 is deviated away from the first point, it may be determined that the table 130 is at tilt. Accordingly, possible tilting can be confirmed with higher accuracy through a plurality of portions of the table.

Accordingly, in the ninth embodiment of the present disclosure, by installing only one expensive mark photographer 660 on one portion of the first pillar part 512 that corresponds to the first test zone among a plurality of test zones 121, 122 where an item in most need of the tilt inspection is positioned, and installing relatively cheaper position marks 550, 650 on respective portions of the table 130 all across the test zones 121, 122, cost can be reduced, and more accurate tilt checking is enabled through a plurality of portions of the table 130.

The present disclosure has been described in detail. However, it should be understood that the detailed description and specific examples, while indicating preferred embodiments of the present disclosure, are given by way of illustration only, since various changes and modifications within the scope of the disclosure will become apparent to those skilled in the art from this detailed description.

The invention claimed is:

1. A method for checking whether a table is at tilt or not, using a table tilt checking apparatus for use in a camera module inspecting apparatus that comprises: a fixing part; a plurality of test zones provided above the fixing part; a table movable to sequentially guide a camera module to the respective test zones; and a chart respectively provided in one or more of the test zones among the plurality of test zones, wherein the table tilt checking apparatus comprises: a first position mark marked on the table; a first mark photographer provided on the fixing part, facing toward the first position mark, wherein, when the one or more test zones comprise first and second test zones, and the one or more charts comprise a first chart provided in the test zone and a second chart provided in the second test zone, the first position mark is marked on a portion of the table that corresponds to the first test zone; a second position mark marked on a portion of the table that corresponds to the second test zone; and a second mark photographer provided on the fixing part, facing toward the second position mark, wherein position of the second position mark or the second mark photographer is determined such that, in an initial state in which the camera module inspecting apparatus is normally installed, the second position mark is placed at a second point of a portion that is photographed by the second mark photographer, the method comprising:
in an initial state in which the camera module inspecting apparatus is normally installed, adjusting the first mark photographer or the first position mark such that the first position mark is placed at a first point of a portion that is photographed by the first mark photographer;
in the initial state in which the camera module inspecting apparatus is normally installed, adjusting the second mark photographer or the second position mark such that the second position mark is placed at a second point of a portion that is photographed by the second mark photographer;
when the table moved from the first position is returned to the first position, driving the first and second mark photographers to photograph the first and second position marks, respectively; and
checking whether the first position mark is placed at the first point of the portion photographed by the first mark photographer, and simultaneously checking whether the second position mark is placed at the second point of the portion photographed by the second mark photographer, and if the first position mark is not at the first point or if the second position mark is not at the second point, determining that the table is at tilt from the initial state.

2. A method for checking whether a table is at tilt or not, using a table tilt checking apparatus for use in a camera module inspecting apparatus that comprises: a fixing part; a plurality of test zones provided above the fixing part; a table movable to sequentially guide a camera module to the respective test zones; and a chart respectively provided in one or more of the test zones among the plurality of test zones, the fixing part comprising a main base placed downward apart from the table, wherein the table tilt checking apparatus comprises: a first position mark marked on the table; a first mark photographer provided on the fixing part, facing toward the first position mark, wherein, when the one or more test zones comprise first and second test zones, and the one or more charts comprise a first chart provided in the test zone and a second chart provided in the second test zone, the first position mark is marked on a portion of the table that corresponds to the first test zone; a second position mark marked on a portion of the table that corresponds to the second test zone; and a second mark photographer provided on the fixing part, facing toward the second position mark, wherein position of the second position mark or the second mark photographer is determined such that, in an initial state in which the camera module inspecting apparatus is normally installed, the second position mark is placed at a second point of a portion that is photographed by the second mark photographer, the method comprising:
in an initial state in which the camera module inspecting apparatus is normally installed, adjusting the first mark photographer or the first position mark such that the first position mark is placed at a first point of a portion that is photographed by the first mark photographer;

in the initial state in which the camera module inspecting apparatus is normally installed, adjusting the second mark photographer or the second position mark such that the second position mark is placed at a second point of a portion that is photographed by the second mark photographer;

when the table moved from the first position is returned to the first position, driving the first and second mark photographers to photograph the first and second position marks, respectively; and checking whether the first position mark is placed at the first point of the portion photographed by the first mark photographer, and simultaneously checking whether the second position mark is placed at the second point of the portion photographed by the second mark photographer, and if the first position mark is not at the first point or if the second position mark is not at the second point, determining that the table is at tilt from the initial state.

* * * * *